(12) United States Patent
Katoh

(10) Patent No.: US 6,820,948 B2
(45) Date of Patent: Nov. 23, 2004

(54) CRAWLER SHOE

(75) Inventor: Shingo Katoh, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 10/276,271

(22) PCT Filed: May 15, 2001

(86) PCT No.: PCT/JP01/04030
§ 371 (c)(1),
(2), (4) Date: Nov. 14, 2002

(87) PCT Pub. No.: WO01/87694
PCT Pub. Date: Nov. 22, 2001

(65) Prior Publication Data
US 2003/0141761 A1 Jul. 31, 2003

(30) Foreign Application Priority Data
May 15, 2000 (JP) .................................... 2000-141567

(51) Int. Cl.$^7$ ............................................. B62D 55/28
(52) U.S. Cl. ..................... 305/188; 305/51; 305/189
(58) Field of Search ................................ 305/187, 188, 305/189, 190, 191, 46, 51

(56) References Cited

U.S. PATENT DOCUMENTS

| | | | | |
|---|---|---|---|---|
| 1,568,090 A | * | 1/1926 | Saives | 305/51 |
| 1,621,371 A | * | 3/1927 | Kegresse | 305/191 |
| 2,129,557 A | * | 9/1938 | Beach | 305/188 |
| 2,869,932 A | * | 1/1959 | Eichweber | 305/51 |
| 4,027,925 A | * | 6/1977 | Black et al. | 305/46 |
| 4,068,905 A | * | 1/1978 | Black et al. | 305/51 |
| 4,597,612 A | * | 7/1986 | Kaizaki | 305/51 |
| 6,213,573 B1 | * | 4/2001 | Nakayama | 305/51 |

FOREIGN PATENT DOCUMENTS

| | | |
|---|---|---|
| JP | 9-104374 A | 4/1997 |
| JP | 11-49049 A | 2/1999 |
| JP | 11-49050 A | 2/1999 |
| JP | 11-245862 A | 9/1999 |
| JP | 11-301537 A | 11/1999 |
| JP | 2000-025662 A | 1/2000 |

* cited by examiner

Primary Examiner—Russell D. Stormer
(74) Attorney, Agent, or Firm—Sughrue Mion, PLLC

(57) ABSTRACT

The object of the invention is to provide a crawler shoe wherein a shoe member is simply and conveniently attached, and members employed are prevented from loosening, without changing the basic structure of shoe plate main body even when not being constructed very accurately. The structure of the crawler shoe having shoe plates, to which shoe members having rubber pads are attached on ground contacting surfaces of the shoe plates, the shoe plates being connected with each other by connecting links on the shoe plates with coupling pins in an endless form is characterized by containing hook parts formed at first ends of the shoe members and configured to be engaged with first side parts the shoe plates, side plates provided on the second ends of the shoe members for retaining the second side parts of the shoe plates, and retaining members provided on the side plates for holding and fixing the second side parts of the shoe plates.

4 Claims, 4 Drawing Sheets

CRAWLER SHOE

DETAILED DESCRIPTION OF THE INVENTION

1. Technical Field of the Invention

The present invention relates to a crawler shoe used for application to a crawler vehicle such as a snow mobile, construction vehicle or a farm vehicle. More specifically, the present invention relates to a crawler shoe comprising shoe members, each having a rubber pad attached on a ground contacting surface thereof, the shoe members being connected with each other by coupling links provided on a shoe plate.

2. Background Art

Crawler vehicles having crawlers or endless tracks have been frequently used as construction vehicles or farm vehicles which are often used at muddy places, or as snow mobiles which often travel on slippery slanted snow surfaces. In order to minimize noise and prevent road surfaces from being damaged, metal members used on the ground contacting surface of a crawler are increasingly replaced by rubber members.

Shoe members such as rubber pads are installed to shoe plates (track blocks) to form various structures.

FIG. 6 shows an example of the installation structures which are disclosed in Japanese Kokai Publication Hei 8 (1996)-58647. It is disclosed in the publication that a core 103, which has hooks 105 and 106 on both ends and a rubber member 104 adhered on the back surface, is installed to shoe plates 102. The shoe plates 102 are linked with each other by track links 101, so that an endless belt is formed. First, the slightly longer hook 106 of the core 103 at the right side engages with the right end of the shoe plate 102; the core 103 is moved to the left; the hook 105 of the core 103 at the left side is engaged with the left end of the shoe plate 102; and then the core 103 is slid to the right. Accordingly, a vacant space 107 is formed between the inner face of the hook 106 and the right edge of the shoe plate 102. Afterwards, a lock pin 108 is driven into the vacant space 107 in a driving direction (direction crossing the sheet) to fix the core 103 with the shoe plate 102.

In the installation where hooks 105 and 106 in a pair are prepared at both ends of the core 103 for the installation of a shoe plate, it is necessary to slide the core 103 to the left and tight with respect to the shoe plate 102, and to drive the lock pin 108 into the vacant space 107. In this case, the vacant space 107 and the lock pin 108 have to be accurately prepared with respect to each other. Moreover, there is a possibility that the lock pin 108 falls off because of excessive wear of the rubber member 104 after a long time of use.

Therefore, the applicant of the invention proposed a crawler shoe shown in FIG. 7 and disclosed in Japanese Kokai Publication Hei 9 (1997)-95267. The publication describes a band plate 29 having a hook fitting at one end and a nut 32 embedded near the other end. The hook fitting 31 provided at one end of the band plate 29 is engaged with one end of a shoe plate 22. The band plate 29 is overlaid with the shoe plate 22 by simply swinging the band plate 29 using the engaging point as a fulcrum. Finally, a bolt is inserted from the upper surface of the shoe plate 22 and screwed into the nut 32. In this way, the attachment of the band plate with the rubber pad has been further simplified, and the demounting or disassembling can be easily performed. Furthermore, this crawler shoe does not have to be particularly accurately manufactured since the band plate 29 is firmly fixed with the shoe plate 22 by screwing the bolt into the nut 32.

Problems to be Solved by the Invention

The attachment of the shoe member to the shoe plate was simplified in the above-mentioned crawler shoe proposed by the applicant of the present invention, which does not particularly need to be accurate. Therefore, the operational efficiency was improved. However, when the bolt is screwed against the nut 32 in the shoe plate 22 at the other end of the band plate 29, it is necessary to provide at least some alignment for the members attached to the shoe plate. Furthermore, the structure of the band plate 29 has to be changed for embedding the nut 32 therein. Moreover, a crawler made of iron should have two holes for screwing bolts therein. If there are no holes on the crawler, it is necessary to perform a perforation operation.

It is therefore an object of the present invention to provide a crawler prepared by solving the conventional problems, which improves the above-mentioned crawler shoe prepared by the applicant of the invention, and can be simply attached to a main body of the band plate 29, and which will not be easily loosened even when not being constructed very accurately.

Means to Solve the Problems

To achieve the above-mentioned object, a crawler shoe according to the invention having shoe plates, to which shoe members having rubber pads are attached on ground contacting surfaces of the shoe plates, the shoe plates being connected with each other by connecting links each on the shoe plates with coupling pins in an endless form, comprises hook parts formed at first ends of the shoe members and configured to be engaged with first side parts of the shoe plates; side plates provided on the second ends of the shoe members for retaining the second side parts of the shoe plates; and retaining members provided on the side plates for holding and fixing the second side parts of the shoe plates, said retaining members being formed as spring pins, which can be made smaller and restored in a diameter direction, said spring pins being inserted into retaining holes formed in said side plates, and holding and fixing the second side parts of said shoe plates by pressing the upper surfaces of said shoe plates.

By having such structure, first, the hook parts provided at the first ends of the shoe members are engaged with the first ends of the shoe plates at engaging points; then, the shoe members are overlaid with the shoe plates by simply swinging the shoe members using the engaging points as fulcrums, and finally, retaining members are attached to the side plates. Only by such simple attachment, the second side parts of the shoe plates are securely damped and fixed, and will not be easily loosened. By the simple attachment performed by inserting and holding the spring pins into the side plates, the shoe members are attached to the shoe plates without loosening, and the demounting operation is also carried out extremely easily.

The crawler shoe is characterized in that the spring pins in the side plates are inserted and held in the side plate so as to downwardly slope from a retaining side portion to a non-retaining side portion, the non-retaining side portion being closer to the shoe plates to be held. Accordingly, the shoe plates can be more efficiently held by the elasticity of the spring pins.

The crawler shoe can be further characterized in that the hook members are covered with an elastic material. By having such structure, it is possible to more roughly prepare the hook parts because of the soft elastic material interposed between the hook members and the shoe plates.

BRIEF DESCRIPTION OF THE INVENTION

FIG. 1 includes FIGS. 1(A) to 1(D) for showing a crawler shoe of the present invention as a first embodiment: FIG. 1(A) is a exploded perspective view of the crawler and a crawler shoe which is attached to a shoe plate as a constituent of the crawler; FIG. 1 (B) is a front view of a crawler shoe for explaining the attachment to a shoe plate; FIG. 1(C) is a front view of a crawler shoe in the state where the shoe member has been attached to the shoe plate: and FIG. 1(D) is a cross-section of FIG. 1(C) cut along a line A—A therein.

FIG. 2 is a cross-section of the crawler shoe at an essential part as a second embodiment according to the invention.

FIG. 3 includes an entire front view of a crawler shoe at an essential part as a third embodiment of the present invention, and a front view thereof.

Figure 1:
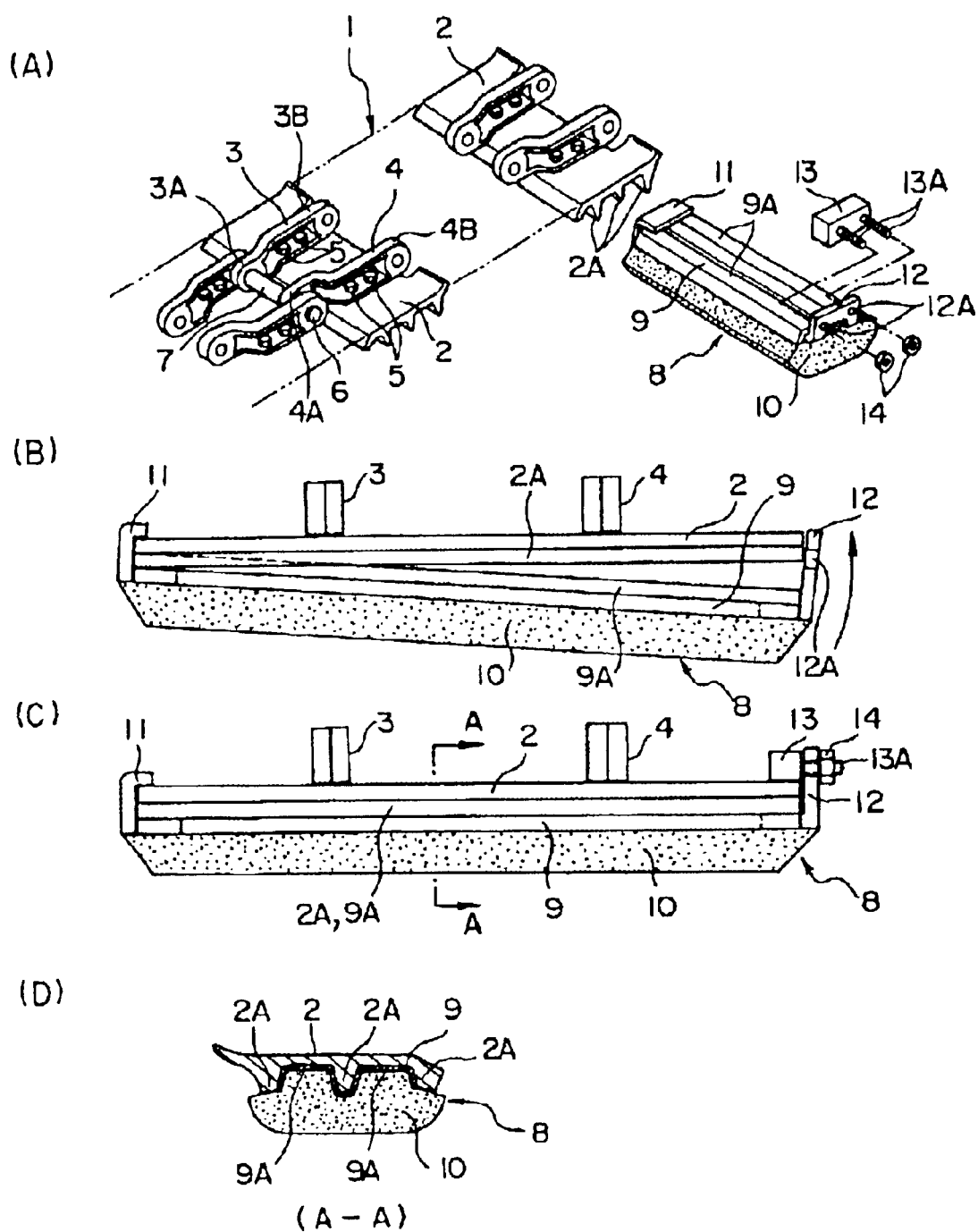

Embodiments of the present invention will now be explained by referring to figures.

EMBODIMENTS

As shown in FIG. 1(A), a crawler shoe 1 as an embodiment of the invention includes shoe members 8 each having a rubber pad 10, and are attached to shoe plates 2 on ground contacting surfaces. The shoe plates 2 are linked with one another by connecting links 3 and 4 provided on the shoe plates 2 with coupling pins 6. Thus, the crawler shoe 1 is formed in an endless belt shape.

A hook part 11 is formed on one end of the shoe member 8 for engagement with one side part of the shoe plate 2. On the other end of the shoe member 8, a side plate 12 is embedded for engagement with the other side part of the shoe plate 2. A retaining member 13 is attached to the side plate 12, and the retaining member 13 is fixed to the other side part of the shoe plate 2 by engaging and holding the same. For this purpose, the retaining members 13 are provided approximately in parallel with each other on the upper surfaces of the shoe plates 2. The left and right links 3 and 4 forming a pair of links are fixed to the upper surface of the shoe plate 2 by bolts 5, 5. Inner parts 3A and 4A of the links 3 and 4 located in the front are superimposed with outer parts 3B and 4B of the links 3 and 4 located in the rear. The links 3 and 4 are connected with each other by inserting a bushing, usually employed for the engagement of a sprocket, as an outer part, followed by inserting coupling pins 6 therein. The crawler shoe 1 is a structure prepared by combining many shoe plates 2.

In this embodiment, the shoe member 8 has the hook part 11 on one end thereof, and the side plate 12 is embedded on the other end of the shoe member 8. This side plate 12 has retaining holes 12A perforated therein. It is possible to prepare the hook part 11 and the side plate 12 as separate members and to fix these to a band plate 9 for instance by adhering thereto, as shown in FIG. 1. Alternatively, the hook part 11 and the side plate 12 may be so formed as to be integral with the band plate 9. The band plate 9 is one constituent of the shoe member 8 and adhered to the rubber pad 10. The band plate 9 is a plate member having a predetermined cross-sectional shape.

Retaining bolts 13A made of a deformable elastic material or the like are protruded from the retaining member 13, and inserted into the retaining holes 12A in the side plate 12. The retaining bolts 13A are screwed into nuts 14, so that it is possible to hold/fix the other end of the shoe plate 2 by the retaining member 13 so as not to loosen.

On the band plate 9, two protruded lines 9A, 9A are extended in a widthwise direction of the crawler shoe 1. These protruded lines 9A, 9A have such shapes to fit in gutters formed between two or three lines of ground contacting lugs provided on a ground contacting surface of the shoe plate 2. Accordingly, the shoe member 8 can be fit on the ground contacting surface of the shoe plate 2 without loosening (See FIG. 1(D)).

As shown in FIG. 1(B), first, the hook part 11 provided at one end of the band plate 9 is engaged with one end of the shoe plate 2 (at an engaging point). Then, the shoe member 8 is overlaid with the shoe plate 2 by simply swinging the shoe member 8 as shown by the arrow, using the engaging point as a fulcrum. Finally, as shown in FIG. 1(C), a retaining member 13, which has been made of a deformable elastic material or the like having a relatively large size and is not necessarily required to be dimensionally very accurate, is attached to the side plate 12 provided at the other end of the band plate 9. By the simple attachment, the other side part of the shoe plate 2 is securely clamped and fixed so that it will not be easily loosened.

Moreover, it is preferable that the retaining member 13 has a thickness which presses the upper surface of the shoe plate 2 by elastic deformation when the attachment of the retaining member 13 is completed. It is possible to perform an operation of inserting retaining bolts 13A for the retaining member 13 into retaining holes 12A in the side plate 12 and an operation of screwing the retaining bolts 13A into the nuts 14 by visually inspecting. Therefore, these operations can be easily and conveniently carried out without taking time for alignment of the members.

Figure 2:
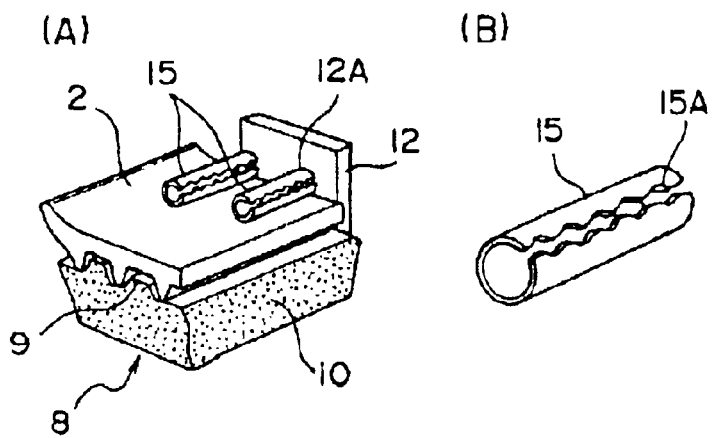

FIG. 2 is a cross-section of the crawler shoe at an essential part as a second embodiment according to the invention.

In this embodiment, a retaining member is formed as a pair of spring pins 15, 15. The spring pins 15, 15 are inserted into the retaining holes 12A in the side plate 13 and are held therein. The spring pins are provided for urging/pressing themselves to the upper surface of the shoe plate 2.

The spring pin 15 is prepared from an elastic material having a slit 15A (wave formed slit in this embodiment) in the axial direction thereof as shown in FIG. 2(B). The spring pin 15 diminishes in a direction of the diameter when inserted into the retaining hole 12A of the side plate 12. The spring pin is held in the retaining hole 12A and fixed thereto by the restoring force.

The spring pin 15 can be formed in a tapered shape so as to press the upper surface of the shoe plate 2 more strongly as it is further inserted into the retaining hole 12A of the side plate 12.

Accordingly, the shoe member 8 can be attached to the shoe plate 2 without loosening even by easy installation, that is, to insert and hold the spring pins 15 in the side plate 12. Moreover, the detaching operation can be extremely readily carried out.

Figure 3:
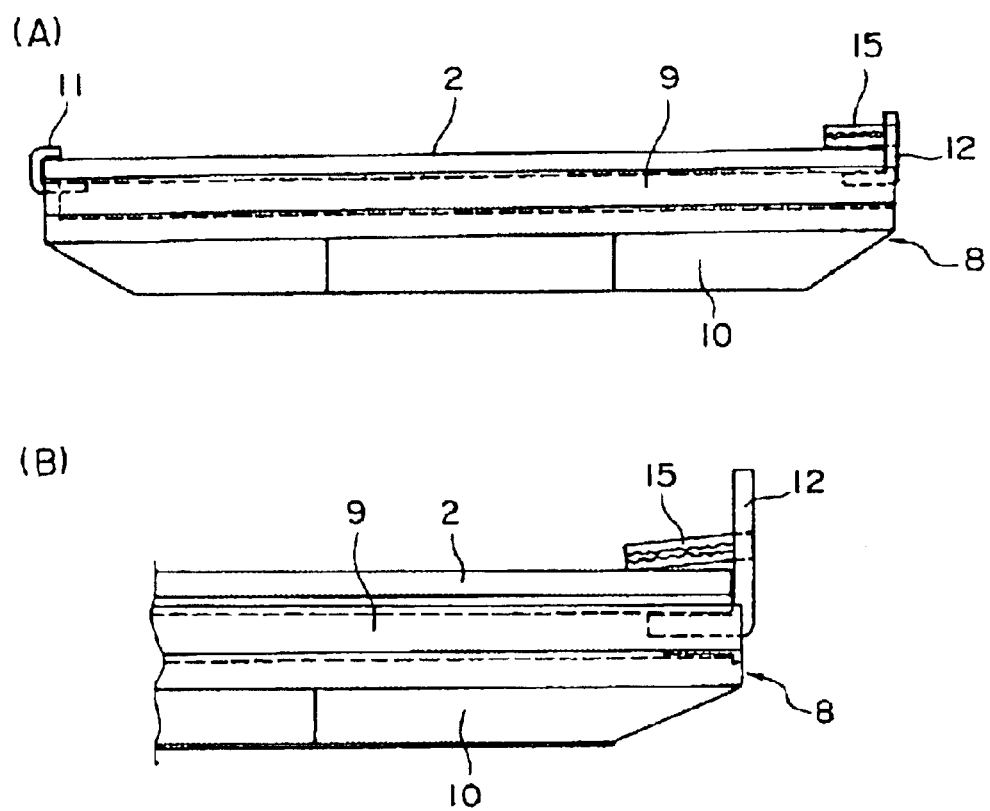

FIG. 3 includes an entire front view of a crawler shoe as a third embodiment of the present invention, and a front view at an essential part thereof.

The crawler shoe of this embodiment has the basic structure which is the same as that shown in FIG. 1 or 2. The feature of the third embodiment is to have the hook part 11 and the side plate 12 which are to be later inserted into the shoe member 8 from both sides of the band plate 9.

In the previously mentioned embodiments, the hook part 11 and the side plate 12 can be formed as they are integral with the band plate 9. However, in this embodiment, the band plate 9 is standardized as a generally usable member. In other words, the band plate 9 is prepared so as to be adaptable to the shoe plate 2 in any size to which the shoe member 8 is attached. Then, the hook member 11 in U shape and the side plate 12 in L shape are appropriately selected to later connect or fix these to the band plate 9 as a generally usable member.

In this embodiment, the spring pin 15 is inserted to the side plate 12, or the spring pin 15 is inserted to the side plate on the slant as shown by the modified embodiment shown in FIG. 3(B) to fix the shoe member 8 to the shoe plate 2 without loosening.

Figure 4:
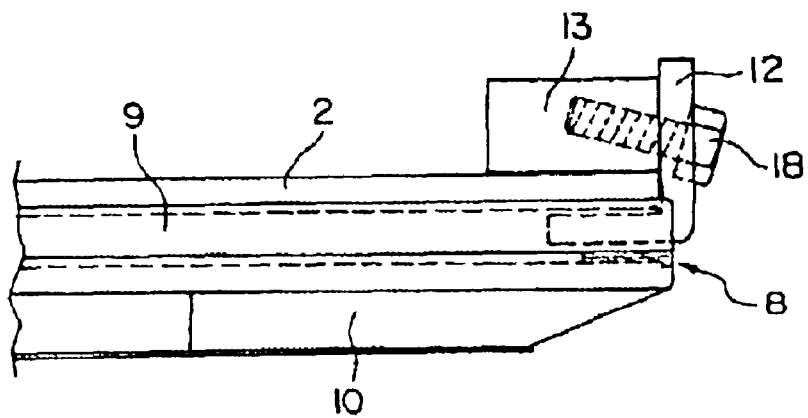
FIG. 4 is a front view for showing a crawler shoe at an essential part as a fourth embodiment according to the present invention.

FIG. 4 is a front view for showing a crawler shoe at an essential part as a fourth embodiment according to the present invention.

This embodiment has a basic structure which is the same as that shown in FIG. 1. To the basic structure, the above-mentioned hook part 11 and the side plate 12 are attached to both ends of the band plate 9 in the shoe member 8, and a separately prepared retaining bolt(s) 18 is/are screwed into the side plate 12 on the slant when the retaining member 13 is attached thereto.

With the advance of screwing the retaining member 13 into the retaining bolt 18, the retaining member 13 is coming to press the upper surface of the shoe plate 2 by catching the same. Therefore, the shoe member 8 having the band plate 9 as a generally usable member can be attached to shoe plates 2 in various sizes without loosening.

Figure 5:
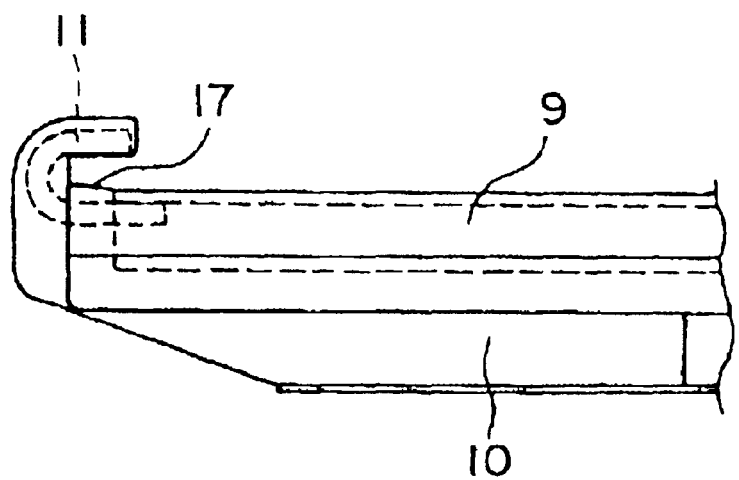
FIG. 5 is a front partial view of a crawler shoe at an essential part as a fifth embodiment according to the present invention.
Figure 6:
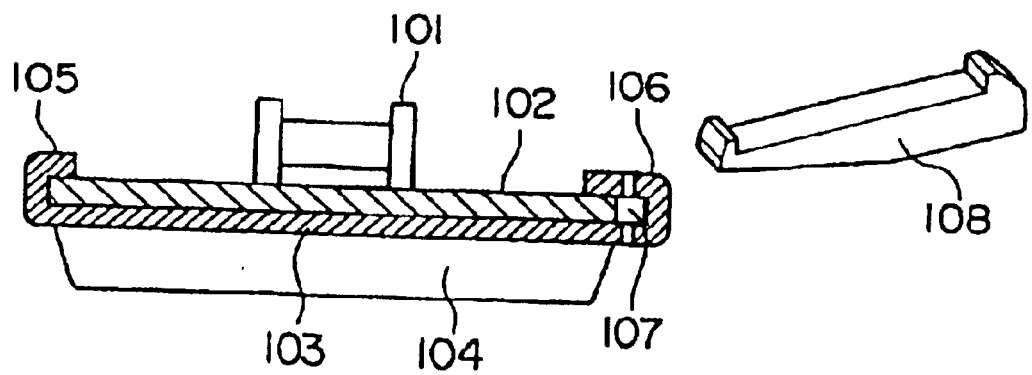
FIG. 6 is a view for explaining a conventional crawler shoe as an embodiment.
Figure 7:
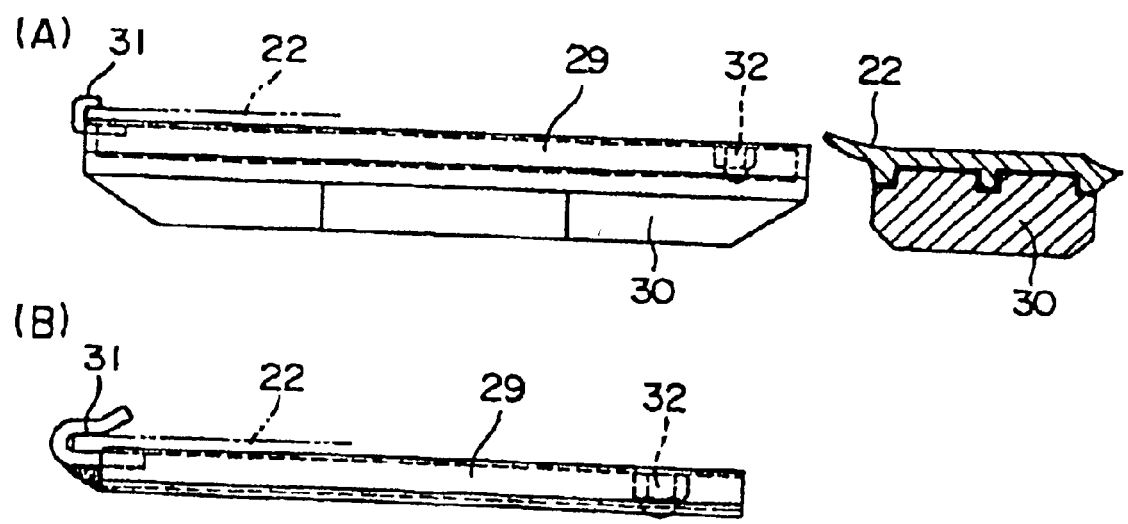
FIG. 7 is a view for explaining a crawler shoe and a band plate as a background art of the present invention.

FIG. 5 is a front partial view of a crawler shoe at an essential part as a fifth embodiment according to the present invention.

The crawler shoe in this embodiment has the basic structure which is the same as that shown in FIG. 3 or 4. In the crawler shoe as the fifth embodiment, the hook member 11 is covered with an elastic material such as a rubber, and a rubber part 17 is interposed for the engagement with the hook member 11.

In the crawler shoe of this embodiment having such structure, the hook part 11 can be more roughly prepared in terms of accuracy, and the band plate 9 in the shoe member 8 exhibits the loosening preventing function and sound-proofing function with respect to the side part of the shoe plate 2 held/attached by the engagement.

Other than the above mentioned embodiments of the present invention, it is possible to appropriately adapt various kinds of modifications within the scope of the present invention as to the shape/type of a shoe member having a rubber pad, the shape of a shoe plate, the connecting form by links, the shapes of a hook part and a side plate, and the attaching style of these to a shoe plate, the shape/type of a retaining member, and the attaching form of members to the side plate (such as the type of a spring pin as a retaining member).

As mentioned above, a crawler shoe is provided wherein a shoe member is simply and conveniently attached and members employed are prevented from loosening, without changing the basic structure of the shoe plate main body even when not being constructed very accurately.

What is claimed is:

1. A crawler shoe having shoe plates, to which shoe members having rubber pads are attached on ground contacting surfaces of said shoe plates, said shoe plates being connected with each other by connecting links each on said shoe plates with coupling pins in an endless form, comprising:

hook parts formed at first ends of said shoe members and configured to be engaged with first side parts of said shoe plates;

side plates provided on the second ends of said shoe members for retaining the second side parts of said shoe plates; and retaining members provided on said side plates for holding and fixing the second side parts of said shoe plates, said retaining members being formed as elastic members approximately in the form of cylinders having diameters which can be made smaller and restored, said elastic members being inserted into retaining holes formed in said side plates, and holding and fixing the second side parts of said shoe plates by pressing the upper surfaces of said shoe plates.

2. The crawler shoe as claimed in claim 1, wherein said elastic members in said side plates are inserted and held obliquely in said side plate so as to slope from a retaining side portion to a non-retaining side portion, said non-retaining side portion being closer to said shoe plates to be held.

3. The crawler shoe as claimed in claim 1, wherein said hook parts are covered with an elastic material.

4. A crawler shoe having shoe plates, to which shoe members having rubber pads are attached on ground contacting surfaces of said shoe plates, said shoe plates being connected with each other by connecting links each on said shoe plates with coupling pins in an endless form, comprising:

hook parts formed at first ends of said shoe members and configured to be engaged with first side parts of said shoe plates;

side plates provided on the second ends of said shoe members for retaining the second side parts of said shoe plates; and retaining members provided on said side plates for holding and fixing the second side parts of said shoe plates, said retaining members being formed as spring pins, said spring pins being inserted into retaining holes formed in said side plates, and holding and fixing the second side parts of said shoe plates by pressing the upper surfaces of said shoe plates, wherein said spring pins in said side plates are inserted and held obliquely in said side plate so as to slope from a retaining side portion to a non-retaining side portion, said non-retaining side portion being closer to said shoe plates to be held.

* * * * *